US006688901B2

(12) United States Patent
Boyd et al.

(10) Patent No.: US 6,688,901 B2
(45) Date of Patent: Feb. 10, 2004

(54) COMBINATION ELECTRICAL CONNECTOR AND MODULAR OFFICE PANEL

(76) Inventors: Charles W. Boyd, 4717 Carter St., Oregon, WI (US) 53575; Andrew Yahn, 133 N. Lexington, Spring Green, WI (US) 53588

( * ) Notice: Subject to any disclaimer, the term of this patent is extended or adjusted under 35 U.S.C. 154(b) by 0 days.

(21) Appl. No.: 10/335,503

(22) Filed: Dec. 31, 2002

(65) Prior Publication Data

US 2003/0124894 A1 Jul. 3, 2003

Related U.S. Application Data

(60) Provisional application No. 60/343,537, filed on Dec. 31, 2001.

(51) Int. Cl.[7] ............................ H01R 4/60; H02G 3/10

(52) U.S. Cl. .......................... 439/215; 174/48; 174/53; 220/3.3

(58) Field of Search ................................ 439/214, 215, 439/216; 174/48, 49, 50, 53, 54, 57, 58, 68.1, 68.3, 59; 220/3.2, 3.3, 3.8, 4.01, 4.02; 52/220.1, 220.3, 220.7

(56) References Cited

U.S. PATENT DOCUMENTS

| | | | | |
|---|---|---|---|---|
| 3,676,974 A | * 7/1972 | Daly | 174/48 |
| 4,056,297 A | * 11/1977 | Gartung | 439/215 |
| 4,603,229 A | * 7/1986 | Menchetti | 174/48 |
| 4,899,018 A | * 2/1990 | Sireci | 174/48 |
| 4,993,576 A | * 2/1991 | Byrne | 174/58 |
| 5,086,194 A | * 2/1992 | Bruinsma | 174/48 |
| 5,178,555 A | * 1/1993 | Kilpatrick et al. | 439/215 |
| 5,183,406 A | * 2/1993 | Glen | 439/211 |
| 5,277,005 A | * 1/1994 | Hellwig et al. | 174/48 |
| 5,349,135 A | * 9/1994 | Mollenkopf et al. | 174/48 |
| 5,913,787 A | * 6/1999 | Edwards | 174/48 |
| 5,994,644 A | * 11/1999 | Rindoks et al. | 174/48 |
| 6,349,516 B1 | * 2/2002 | Powell et al. | 52/220.7 |
| 6,469,247 B1 | * 10/2002 | Dodds et al. | 174/50 |
| 6,491,535 B1 | * 12/2002 | Buse | 439/215 |

* cited by examiner

*Primary Examiner*—Dean A. Reichard
*Assistant Examiner*—Angel R. Estrada
(74) *Attorney, Agent, or Firm*—Joseph T. Leone, Esq.; DeWitt Ross & Stevens, S.C.

(57) ABSTRACT

Disclosed is an electrical connector and modular panel combination. The combination includes an electrical connector and jack slidingly attached to a support member, wherein the support member supports a corresponding modular panel. The modular panel includes a flexible lip disposed on one or more of its peripheral edges. When the electrical connector is slidingly engaged to the support member, an electrically conductive cable disposed within the jack can pass across the flexible lip disposed on the modular panel.

11 Claims, 4 Drawing Sheets

COMBINATION ELECTRICAL CONNECTOR AND MODULAR OFFICE PANEL

CROSS-REFERENCE TO RELATED APPLICATIONS

Priority is hereby claimed to provisional application Ser. No. 60/343,537, filed Dec. 31, 2001, the entirety of which is incorporated herein.

FIELD OF THE INVENTION

The invention is directed to an electrical connector (for electricity, voice, data, or any combination thereof) that is adapted and configured for use in combination with modular office panels.

BACKGROUND

Modular office panels, that is, "cubicles," have become an ubiquitous staple of American business place design. Whether in an effort to maximize the efficient use of office space, to foster a sense of "team," to remove psychological barriers between management and labor, or to minimize hierarchical divisions within the work force, the use of semi-private office cubicles (as opposed to private offices) has blossomed over the last 20 years.

At the same time, the use of a wide range of electronic equipment has also blossomed. Whereas 50 years ago, a secretary might only have a manual typewriter at his or her desk, today's executive assistant (as well as the executive proper) might have as many as ten (or more) electrically-powered machines within arm's reach: a computer, a multi-line telephone, a fax machine, a modem, a color printer, a draft black and white printer, and (just maybe), an electric typewriter. In the cramped confines of an office cubicle, not only does this large collection of equipment take up much-needed space, the jungle of wires required to power and connect all of these devices makes many work places appear to be constantly under construction, even when they aren't. Thus, there remains a long-felt and unmet need for an electrical connector-panel combination that can be placed where it is needed, that can be moved at will, and that does not require holes to be cut into the modular panels.

DETAILED DESCRIPTION OF THE INVENTION

The present invention addresses the above-noted problems by providing an electrical connector that is adapted and configured to function in combination with modular office panels. As described below, the connector eliminates the need for a fixed-position electrical connector that protrudes from the panel itself because the connector is embedded within the modular panel itself and can be placed virtually anywhere within the panel. Electrical cord then pass through a flexible lip protruding from the bottom edge of the modular panel, thus allowing the required connections to be made.

Figure 1:
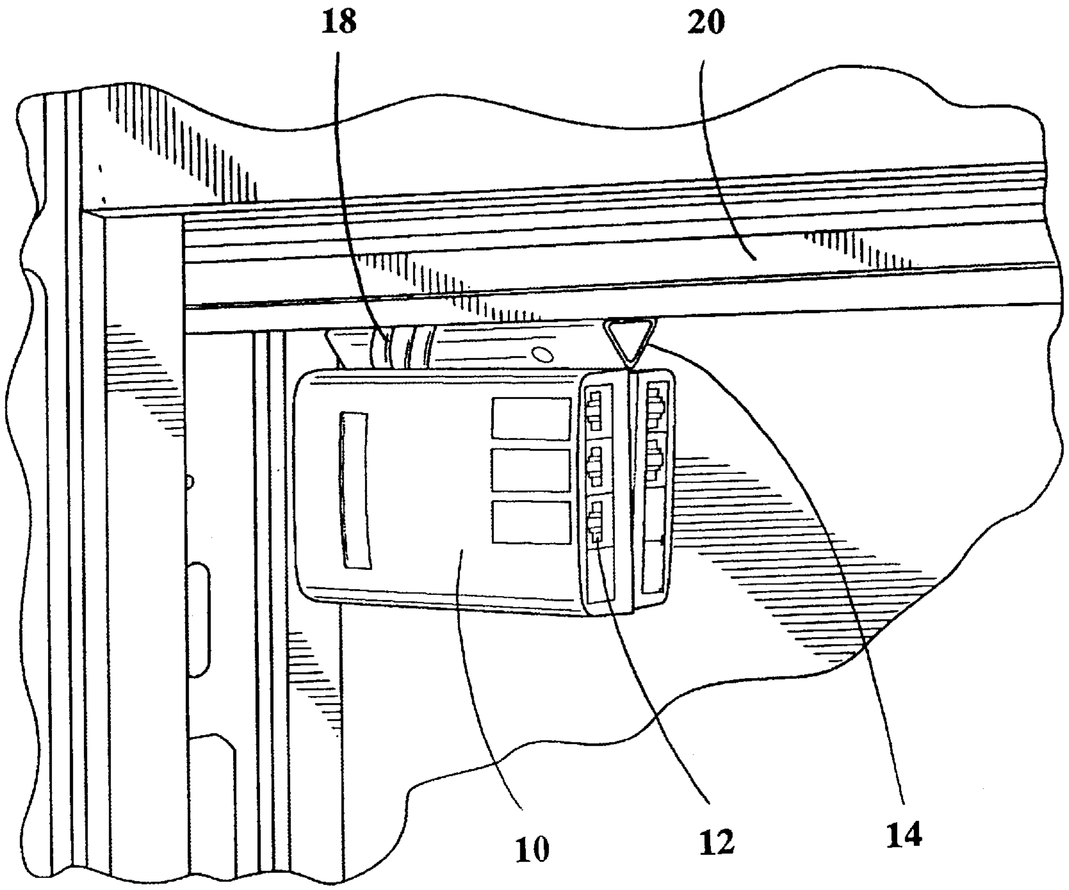
FIG. 1 is a close-up, right-side perspective rendering of a pair of electrical connectors according to the present invention, mounted back-to-back within a modular panel.

Referring now to the figures, where like numbers describe like features throughout all of the drawings, FIG. 1 shows a pair of connectors 10 according to the present invention. The two connectors are mounted back-to-back within a modular panel assembly 22 and 24 (see FIG. 2). The connector 10 includes a housing having disposed therein at least one jack 12. The jack 12 can be for transmitting voice, data, electricity, etc. The configuration of the jack is not critical to the function of the invention. The connector 10 is linked to a central power supply, telephony network, and/or data network, etc. via wires 18.

Figure 2:
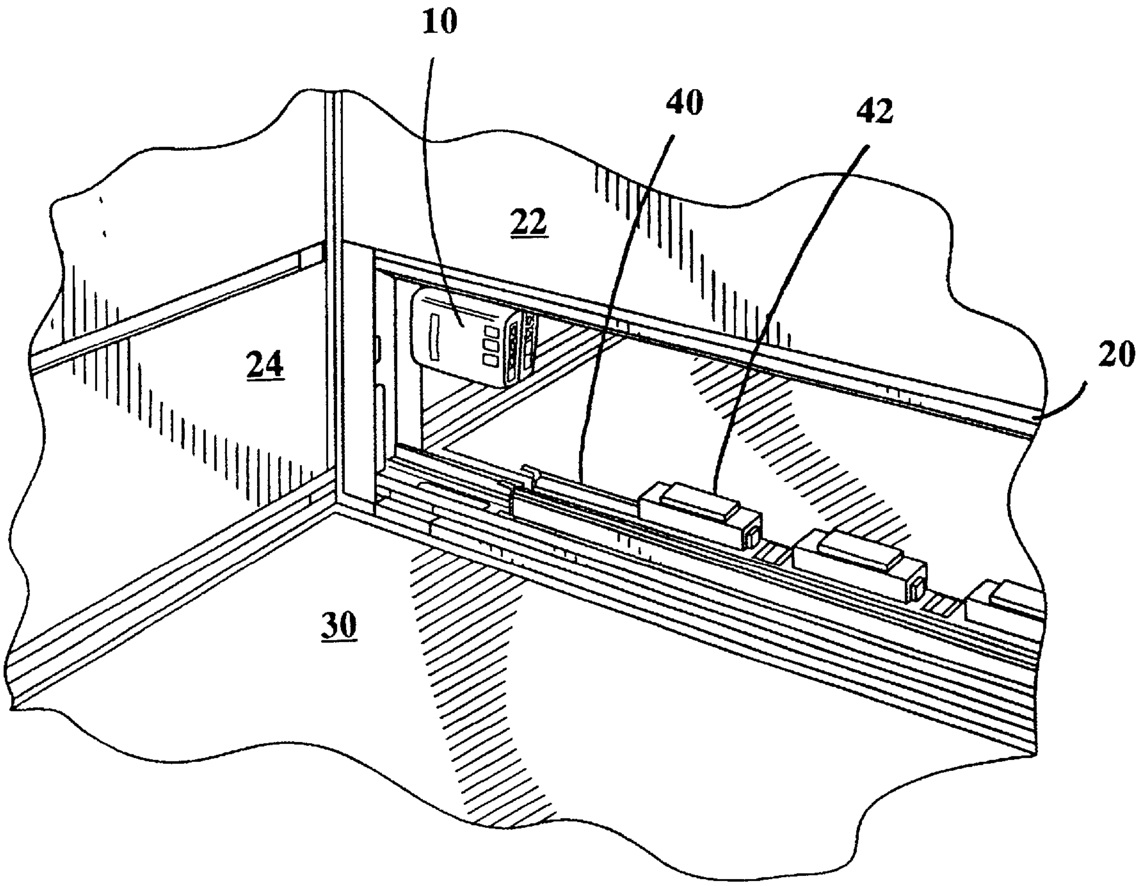
FIG. 2 is more distant view of the rendering of FIG. 2, showing the relationship of the paired connectors to the modular cubicle into which it is placed. Also visible is a bank of standard 3-prong, grounded electrical outlets.

The connector 10 is mounted within a modular panel assembly 22 and 24 via mounting bracket 14 that is reversibly and slidingly fixed to panel support member 20. As shown in FIG. 1, the mounting bracket 14 is a member having a triangular cross section that slidingly engages the support member 20. In this fashion, the mounting bracket 14, and the connectors attached to it, may be positioned at any point along the length of the support member 20. For example, as shown in FIG. 2, the mounting bracket and its associated connectors are disposed at the far left-hand end of the support member 20. The sliding connection between the mounting bracket and the support member, however, allows for the connector to be positioned at any convenient point along the length of the support member. Once disposed in a desirable location, the mounting bracket may be semi-permanently anchored in place using any type of conventional means for fastening, such as bolts, screws, clamps, and the like. Alternatively, the mounting bracket may be allowed to slide freely along the length of the support member 20.

Figure 4:
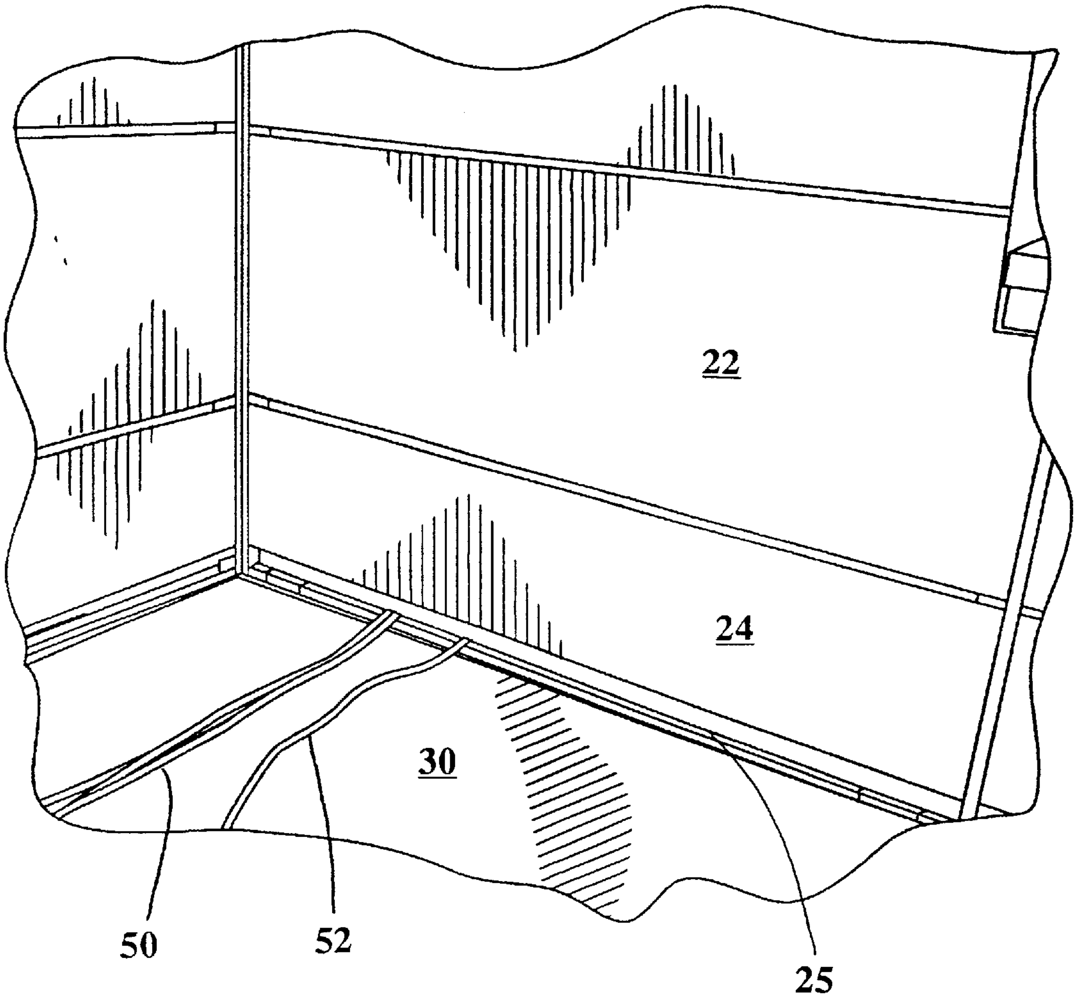
FIG. 4 is a perspective rendering depicting how the modular panel, with the connector inside, appears when the modular panel is completely assembled and an electrical device is connected.

With particular reference to FIGS. 2 and 4, note that the modular panel construction comprises upper panel 22 (which is removable), lower panel 24 (also removable), and support member 20, to which panel sections 22 and 24 are ultimately attached when the cubicle is fully constructed (see FIG. 4). Desk top surface 30 may also optionally be present to complete the modular panel assembly.

Figure 3:
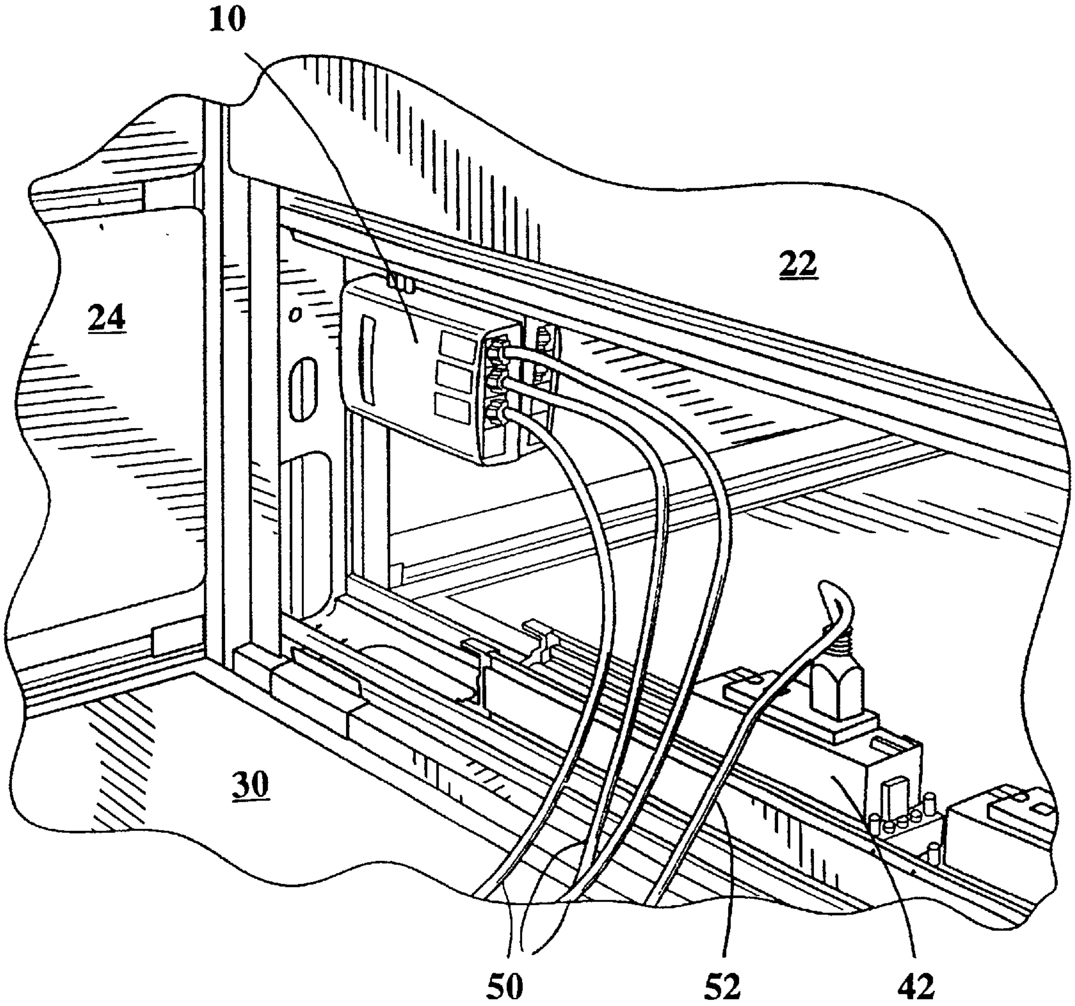
FIG. 3 is a perspective rendering of a connector according to the present invention showing telephone and computer network cables connected to the connector.

Referring now to FIGS. 2 and 3, a plug bar 40, having disposed thereon a plurality of electrical outlets 42 may also optionally be provided. The electrical outlets 42 are preferably of the convention 3-prong grounded configuration, although this is not critical to the functionality of the disclosed invention. The electrical outlet 42 may be of any design, without limitation. The plug bar 40 is mounted reversibly to the support members of the modular panel assembly using any type of conventional means for fastening, such as bolts, screws, clamps, and the like. In the same fashion as the mounting bracket 20, the plug bar 40 may be allowed to slide freely along the length of the support member to which it is attached.

FIG. 3 depicts the connector 10 with various wire connections 50 being made to it. The wire connections 50 can be for any number of devices: computer network connections, telephone, facsimile, data, etc. The nature of the devices that are ultimately attached to the connector 10 is not critical to the functionality of the invention. Similarly, standard 3-prong electrical supply wire 52 is plugged into the outlet 42.

FIG. 4 depicts the invention when fully assembled. As shown in the figure, upper panel 22 and lower panel 24, which are dimensioned and configured to engage the support members 20 of the modular panel assembly, are removably set in place. When put in place, the panels 22 and 24 hide the connector, mounting bracket, and plug bar.

A flexible lip 25 on one or more edges of the panel 24 illustrates how the electrical connections 50 and 52 are passed between the panel 24 and the desk top 30 to thereby gain access to the connector. As shown in FIG. 4, the lip 25 is on the lower edge of panel 24. This is the preferred configuration. However, the flexible lip 25 can be located on any peripheral edge of either panel 24 or 22. For example, the flexible lip can be disposed at the top edge of panel 24, in which case the wires 50 and 52 would pass between the top edge of panel 24 and the bottom edge of panel 22. In short, the location of the lip 25 is not critical to the function of the invention, provided that the distance between the lip and the connector 10 is sufficiently small so that the electrical connections 50 and 52 can reach the connector 10.

What is claimed is:

1. An electrical connector and modular panel combination comprising:

an electrical connector comprising a housing and at least one jack disposed within the housing, wherein the jack is dimensioned and configured to releasibly engage an electrically conductive cable;

at least one modular panel and a corresponding support member, wherein the support member supports the modular panel and further wherein the modular panel includes one or more peripheral edges; and a flexible lip disposed on at least one of the peripheral edges of the modular panel;

wherein the electrical connector is slidingly engaged to the support member such that an electrically conductive cable disposed within the jack can pass across the flexible lip disposed on the modular panel, and further wherein the electrical connector is hidden from view when the modular panel is affixed to its corresponding support member.

2. The electrical connector and modular panel combination of claim 1, wherein the jack is dimensioned and configured to releasibly engage an electrically conductive cable for transmitting voice, data, or electric current.

3. The electrical connector and modular panel combination of claim 1, further comprising a mounting bracket releasibly attached to the connector and releasibly and slidingly attached to the support member.

4. The electrical connector and modular panel combination of claim 3, wherein the mounting bracket has a triangular cross-section.

5. The electrical connector of claim 3, further comprising means for fastening the mounting bracket in a fixed position on the support member.

6. The electrical connector of claim 5, wherein the means for fastening the mounting bracket is semi-permanent and is selected from the group consisting of bolts, screws, and clamps.

7. The electrical connector of claim 1, further comprising at least one plug bar having attached thereto at least one electrical outlet, wherein the plug bar is releasibly attached to the support member, and wherein the plug bar is hidden from view when the modular panel is affixed to its corresponding support member.

8. The electrical connector of claim 7, wherein the electrical outlet is a three-prong grounded electrical outlet.

9. An electrical connector and modular panel combination comprising:

an electrical connector comprising a housing and at least one jack disposed within the housing, wherein the jack is dimensioned and configured to releasibly engage an electrically conductive cable;

at least one modular panel and a corresponding support member, wherein the support member supports the modular panel and further wherein the modular panel includes one or more peripheral edges;

a flexible lip disposed on at least one of the peripheral edges of the modular panel; and a mounting bracket releasibly attached to the connector and releasibly and slidingly attached to the support member such that the electrical connector is slidingly engaged to the support member, and further wherein the electrical connector is hidden from view when the modular panel is affixed to its corresponding support member.

10. The electrical connector of claim 9, further comprising at least one plug bar having attached thereto at least one electrical outlet, wherein the plug bar is releasibly attached to the support member, and wherein the plug bar is hidden from view when the modular panel is affixed to its corresponding support member.

11. The electrical connector of claim 10, wherein the electrical outlet is a three-prong grounded electrical outlet.

* * * * *